INVENTOR
T. R. D. COLLINS
BY Hugh S. Wertz
ATTORNEY

INVENTOR
T. R. D. COLLINS
BY Hugh S. Wertz
ATTORNEY

Sept. 18, 1956 T. R. D. COLLINS 2,763,718

FIELD SYNCHRONIZING PULSE SELECTOR

Filed Nov. 30, 1951 3 Sheets-Sheet 3

INVENTOR
T. R. D. COLLINS
BY Hugh S. Wertz
ATTORNEY

United States Patent Office 2,763,718

Patented Sept. 18, 1956

2,763,718

FIELD SYNCHRONIZING PULSE SELECTOR

Ted R. D. Collins, Chatham, N. J., assignor to Bell Telephone Laboratories, Incorporated, New York, N. Y., a corporation of New York Application November 30, 1951, Serial No. 259,128

3 Claims. (Cl. 178—7.3)

This invention relates to television circuits and more specifically to vertical synchronizing circuits for television receivers.

In the usual home television receiver, the picture on the screen is "locked-in," that is, the borders of the scanned area are maintained fixed in position relative to the picture material and the geometry of the receiver by means of synchronizing information forming a part of the transmitted signal. The horizontal and vertical sweep circuits at the receiver are adapted to produce saw-tooth waves of the proper frequencies to scan the field within the prescribed time (one-sixtieth of a second under present practice) but, obviously, to maintain sharp borders for the scanned area, the sweeps must be initiated at precisely the proper times each cycle, which starting times must exactly agree with the starting times of the corresponding sweeps at the transmitting station. To maintain such synchronism, horizontal and vertical synchronizing pulses forming parts of the composite R. M. A. television signal are utilized to touch off the sweeps at the proper times. After the horizontal and vertical synchronizing pulses of the received R. M. A. signal have been separated from the video signal, it has been customary to apply the vertical synchronizing pulses to a condenser to accumulate a voltage thereacross which is used to trigger the blocking oscillator in the vertical sweep generator at a time in each scanning cycle corresponding to the presence of vertical synchronizing pulses. It frequently happens, however, that the accumulated voltage on the condenser does not constitute a sharp enough pulse to trigger the sweep oscillator at the right time in each cycle. This absence of precise vertical synchronization at the receiver often results in poor interlacing.

It is accordingly the primary object of the present invention to improve the vertical synchronization of television receivers.

Improved vertical synchronization is obtained in accordance with the present invention by producing from the vertical synchronizng pulse in the received R. M. A. signal a sweep triggering pulse having a much sharper voltage gradient than that used in present day receivers. More specifically, the vertical synchronizing signals are sent through a delay network and the delayed version of each such pulse is added to the original undelayed version thereof to yield a wave form which comprises a voltage step, i. e., the delayed pulse on a pedestal (the undelayed pulse). A "slicer" tube, that is one driven from cut-off to saturation, then operates on this wave form to produce a sharp pulse which is used for triggering a blocking oscillator which generates the vertical sweep wave. The pulse produced in accordance with the invention produces a more positive lock to the television signal synchronizing pulses because of the sharper voltage gradient of the trigger pulse. The vertical synchronization is therefore much more positive, resulting in an improved interlace. The improved synchronizing circuit of the invention finds use not only in ordinary television receivers but in television monitoring equipment as well. The advantages of the invention are in fact very important in such monitoring equipment where a stable interlaced pattern on the viewing tube is essential.

The invention will be more readily understood by referring to the following descripton taken in connection with the accompanying drawings forming a part thereof in which.

Figure 1:
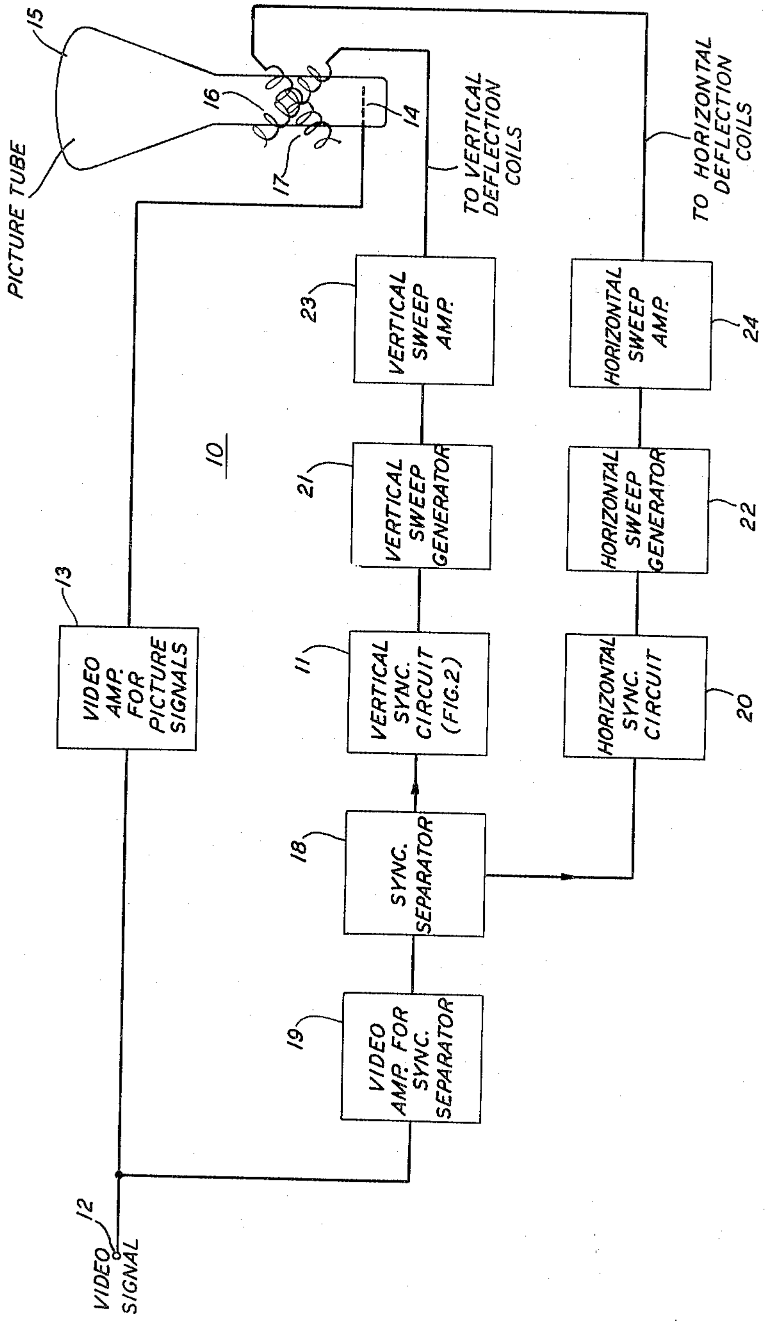
Fig. 1 is a block schematic diagram of the video and sweep circuits of a television receiver.

Reference will now be made more specifically to the drawings. Fig. 1 shows in block diagram an illustrative form of video and sweep circuits 10 of a television receiver which may employ a vertical synchronizing circuit 11 in accordance with the invention. For simplicity in the drawing, Fig. 1 is of the single line block diagram type but it is to be understood that each line between blocks may be representative of a cable which may include two or more wires if necessary. The video signal at the terminal 12 in the television receiver is applied through a video amplifier 13 for the picture signals to the modulating electrode 14 of the picture tube 15. The picture tube 15 is of any suitable type commonly used in television receivers and has a beam therein which forms a spot on the end of the tube. This spot is moved over the face of the tube by means of vertical and horizontal sweep circuits (to be described below) which are synchronized with similar circuits in the television camera where the picture originates. The vertical and horizontal sweep waves are applied respectively to magnetic coils 16 and 17 arranged in the form of a yoke around the neck of the tube 15, as is well known in the art. By means of this sweeping arrangement, the picture information is displayed on the end of the tube 15 in a two-dimensional form and the characteristics of the cathode-ray tube phosphor and the human eye are such as to give the appearance of a continuously changing scene.

The synchronizing information is transmitted from the transmitting station to the receiver as a part of the same signal carrying the picture information and is in the form of a series of pulses of opposite polarity relative to the picture, the composite signal being known as the RMA standard wave form. Both the picture information and the synchronizing pulses are applied to the modulating element 14 of the cathode-ray tube 15 through the video amplifier 13 since the synchronizing pulses serve a useful purpose in the brightness modulation.

The composite signal appearing at the terminal 12 is also applied to a synchronizing separator 18 through a video amplifier 19. This synchronizing signal separator 18 is in reality a "stripping" circuit where the picture information is removed and discarded leaving only the synchronizing pulses since the presence of signals containing parts of the picture information in the vertical and horizontal synchronizing circuits might interfere with the normal operation. The video amplifier 19 need have a pass band sufficient to pass only the synchronizing pulses without distortion since the picture voltages are to be discarded. If desired the output of the video amplifier 19 may be discarded and the synchronizing separator 18 fed from the output of the video amplifier 13.

The output of the synchronizing separator circuit 18 is applied to both the vertical and horizontal synchronizing circuits 11 and 20, respectively. Circuits of this general type are well known and a standard circuit such as is used in television home receivers will be used for the horizontal synchronizing circuit 20. The vertical synchronizing circuit 11 is of special construction in accordance with the invention and will be described below in connection with Fig. 2. The output of each of these synchronizing circuits 11 or 20 has terminal pulses which are either the original synchronizing pulses or are derived from these synchronizing pulses. These terminal pulses are applied to respective sweep generators 21 and 22 each of which in turn produces a properly synchronized saw-tooth sweep voltage. These sweep waves are passed through the respective vertical and horizontal sweep amplifiers 23 and 24 to the deflecting coils (or plates) 16 and 17 associated with the cathode-ray tube 15.

Figure 2:
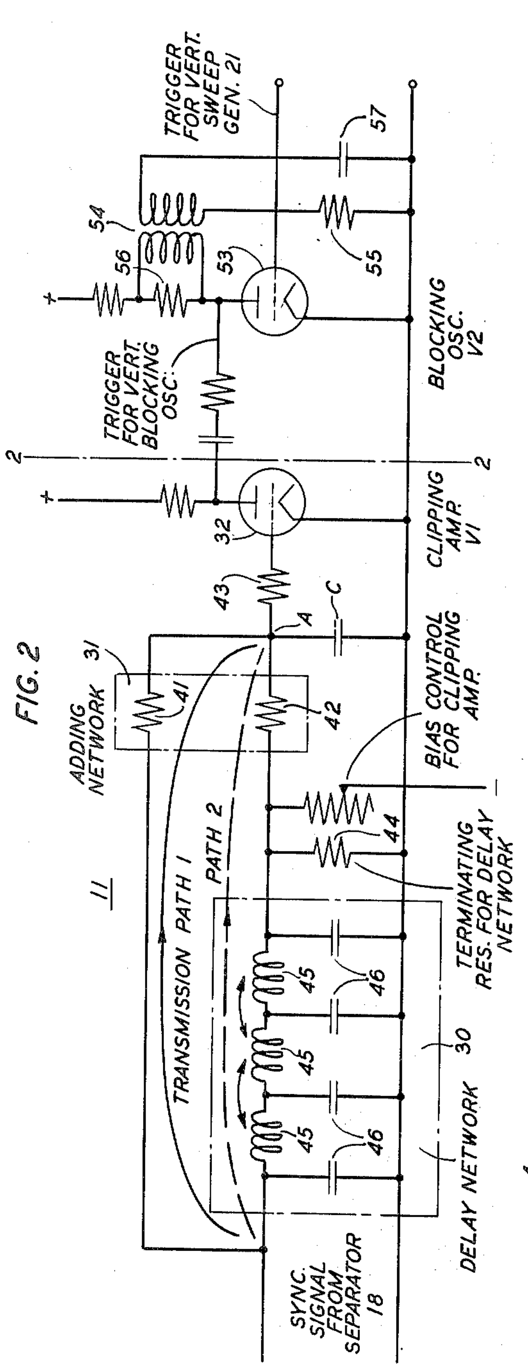
Fig. 2 is a schematic circuit diagram of a vertical synchronizing circuit in accordance with the invention which can be used in the circuit of Fig. 1, Fig. 2 showing also a portion of the vertical sweep generators.

Fig. 2 is a schematic circuit drawing of a vertical synchronizing circuit 11 in accordance with the invention. Basically this circuit 11 comprises a delay network 30, an adding network 31 and a clipping amplifier 32. There has also been shown on the right of line 2—2 in Fig. 2 a blocking oscillator V2 which forms part of the vertical sweep generator 21.

Figure 3:
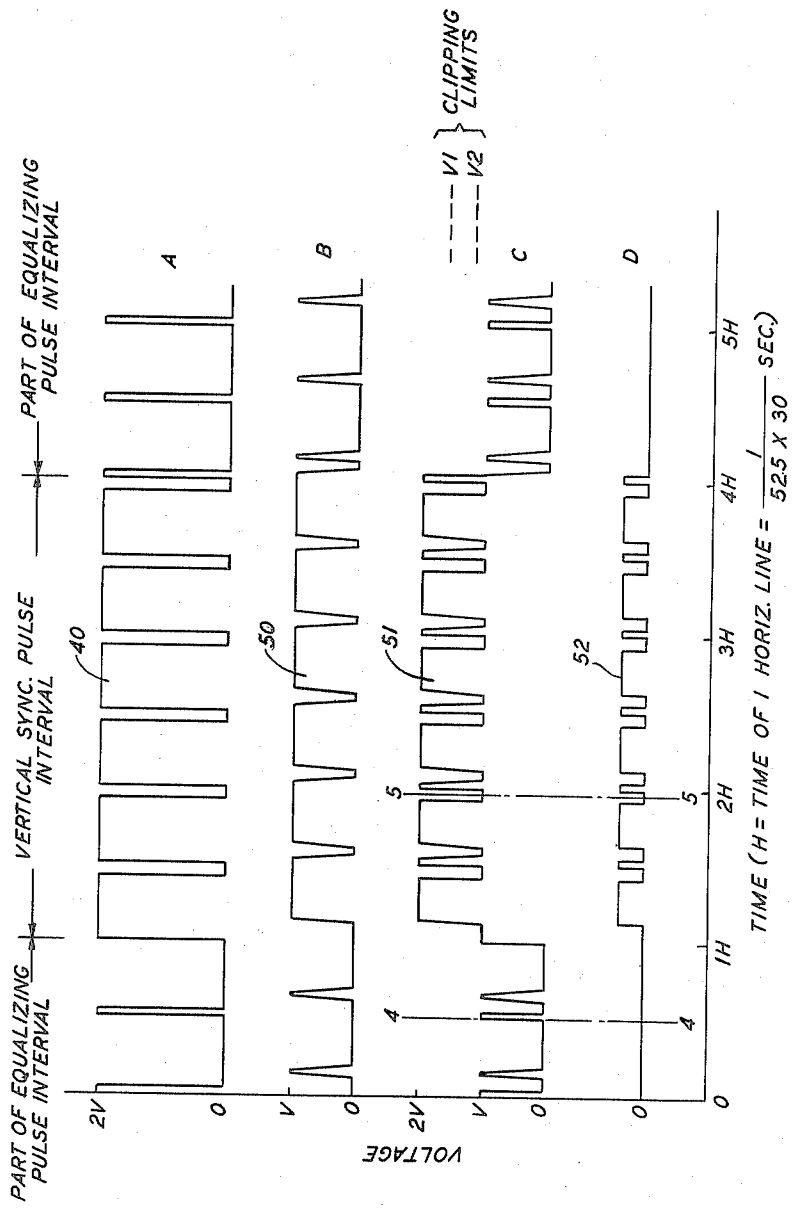

In order to understand the operation of the vertical synchronizing circuit 11, reference will be made also to the voltage-time diagrams shown in Fig. 3. Assume that the condenser C has been removed from the circuit of Fig. 2. Fig. 3 line A shows a portion of the synchronizing signal wave form containing the vertical synchronizing pulses 40 as received from the separator circuit 18. The voltage magnitude is shown as V2. These pulses 40 are transmitted through transmission path 1 in Fig. 2, that is, through the resistance 41 in the adding network 31 to the junction point A of the resistors 42 and 43, the former being the lower resistance in the adding network 31. The pulses 40 suffer no distortion or delay in arriving at the point A but they have a loss of one half of their magnitude so that this component of the pulses at junction point A has a maximum value of V instead of V2. A second voltage component arrives at the same junction point A by the second transmission path, that is, through the delay network 30 and the resistor 44 terminating it. The delay network 30 comprises a plurality of serially arranged inductance members 45 and shunt capacity members 46. The inductances and capacitances of the delay network 30 are chosen so that the signals passing through it are delayed by a time longer than a horizontal synchronizing pulse but considerably shorter than the duration of a vertical synchronizing pulse. By way of example, this delay may be of the order of eight microseconds. The network 30 must not distort the signals appreciably but it may have a low pass characteristic narrow enough to increase the slope of the edges of the pulses somewhat.

Fig. 3 line B shows the form of the synchronizing pulses 50 arriving over transmission path 2 at the junction point A. The pulses have become trapezoidal because of the low pass cut-off of the network 30 and the pulse amplitude has been reduced to V because of loss in the resistance divider circuit formed by the resistors 42 and 44. Thus each pulse 40 of Fig. 3 line A is reproduced in Fig. 3 line B but with a slight delay (eight micro-seconds for example) and with a slight decrease in the sharpness of its edges. The network 30 is assumed to have no loss in its pass band but a moderate amount of flat loss would require merely a rearrangement of resistance values in the adding network 31 so that the two voltage components arriving at junction point A by way of the two transmission paths are of about the same maximum amplitude.

The actual voltage wave form at junction point A in Fig. 2 is shown in Fig. 3 line C, and is the sum of the two voltage components arriving through transmission paths 1 and 2. This voltage wave form 51 is applied to the input of a suitable clipping amplifier circuit V1 including tube 32 which is adjusted to pass only voltages between the limits V1 and V2, as indicated in the drawing. The voltage wave form 52 shown in Fig. 3 line D results. In the wave form 52, all pulses have been removed except those occurring during the vertical pulse interval. These have been delayed by the delay time of the delay network 30 but are positively locked to the corresponding pulses in the primary synchronizing wave form.

Figure 4:
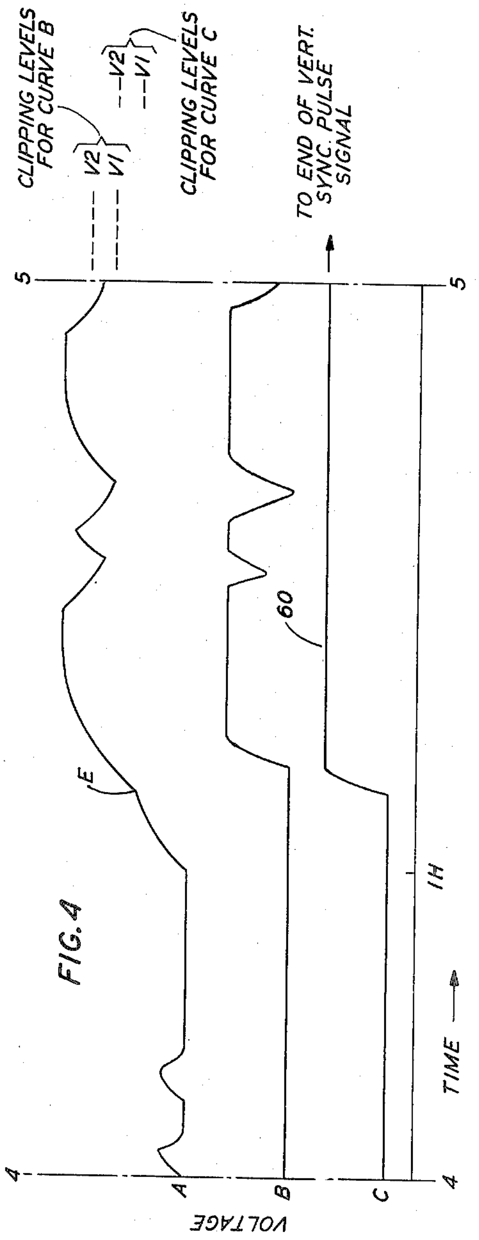
Figs. 3 and 4 are graphical representations which aid in the explanation of the invention.

Since the blocking oscillator V2, comprising the tube 53 and associated circuit elements including transformer 54, resistors 55 and 56 and condenser 57, can be triggered from the first edge of the wave form 52, the shape of the remainder of the pulse is not necessarily important. However, by adding condenser C at the end of the adding network 31, the wave form at the output of the clipping tube V1 (Fig. 3, line D) can be altered as shown in Fig. 4. Fig. 4 line A shows the shape of the pulse which will be applied to the grid of the clipping tube 32 when condenser C is added. The horizontal scale of Fig. 4 is different from that of Fig. 3, the portions shown in Fig. 4 corresponding to those shown between vertical dash-dot lines 4—4 and 5—5 in Fig. 3. Fig. 4 line B represents the output of the clipper tube 32 when the clipping level is adjusted so that the upper clipping voltage V2 is near the upper limit of the voltage in the wave form of Fig. 4 line A and the lower clipping voltage V1 is set near the lower ends of the cusps of the wave form in Fig. 4 line A. A different setting of the clipping levels, V2 being less than the lower cusps and V1 being higher than any of the peaks at the far left of Fig. 4 line A and preferably higher than point E in line A, will result in a single pulse (Fig. 4 line C) at the output of the clipping circuit 32. This pulse (only a portion of which is shown in Fig. 4 line C) will have the length of three horizontal lines which is the period allotted for the vertical synchronizing pulse in the original synchronizing wave form. The synchronizing pulse produced in Fig. 4 line C triggers the blocking oscillator V2 much more sharply than the pulses produced in present day receiving pulses. Actually, any of the wave forms shown in Fig. 4 line B, Fig. 4 line C, or Fig. 3 line D can be used for triggering. For certain types of sweep generating circuits, the triggering pulse of Fig. 4 line C produces the best results.

The main advantage of the vertical synchronizing circuit 11 just described is in the sharply rising, precisely timed, synchronizing pulse 60 shown in Fig. 4 line C (or either of the other suitable wave forms) used to trigger the vertical sweep generator 21 which includes the blocking oscillator V2. A suitable interlaced pattern is thereby produced on the viewing tube 15. In the television art as commonly applied in home television receivers, the trigger pulse for the vertical sweep circuit is obtained from the voltage accumulated on the condenser which "integrates" the synchronizing pulses. When a pulse is long, as is the case for the vertical synchronizing pulses, the condenser charge rises to a higher value than for a short pulse. Since the rate of rise follows as exponential law and the value obtained in a given time is also dependent on the amplitude of the pulse, the "trigger threshhold" is approached less sharply than when using a circuit in accordance with this invention. The vertical synchronization arrangement in the television receivers commonly used today often results in a poor or variable interlace of the picture field, a result which is in sharp contrast to that produced by the present circuit.

It is to be understood that the above-described arrangements are illustrative of the application of the principles of the invention. Numerous other arrangements may be devised by those skilled in the art without departing from the spirit and scope of the invention. For example, any one of a number of suitable electronic circuits can be used to produce the required delay rather than the stationary network 30.

What is claimed is:

1. The combination with means for receiving a television signal containing synchronizing information in the form of timing pulses, of means for causing time delay of said timing pulses, means for adding said delayed pulses to timing pulses which have not been delayed to produce composite pulses, said composite pulses being the delayed pulses on a voltage pedestal formed by the undelayed pulses, means for clipping said composite pulses between upper and lower voltage limits and for utilizing that portion of signal between said limits for producing from said composite pulses a new series of abrupt pulses.

2. The combination of elements as in claim 1 in further combination with condenser means for shaping said composite pulses.

3. The combination with means for receiving a television signal containing horizontal and vertical synchronizing information in the form of timing pulses, means for causing time delay of said timing pulses, means for adding said delayed pulses to timing pulses which have not been delayed to produce composite pulses, said composite pulses being the delayed pulses on a voltage pedestal formed by the undelayed pulses, condenser means for shaping said composite pulses, means for clipping said composite pulses between upper and lower voltage limits and for utilizing that portion of signal between said limits for producing a single new vertical synchronizing pulse in which the original horizontal synchronizing information is absent, said new synchronizing pulse having a length equal to three horizontal lines of the original synchronizing information, a vertical sweep generator, and means for triggering said vertical sweep generator by said new vertical synchronizing pulse.

References Cited in the file of this patent

UNITED STATES PATENTS

| | | |
|---|---|---|
| Re. 22,390 | Lewis | Nov. 9, 1943 |
| 2,200,009 | Nuttall | May 7, 1940 |
| 2,207,775 | Bedford | July 16, 1940 |
| 2,266,154 | Blumlein | Dec. 16, 1941 |
| 2,416,424 | Wilson | Feb. 25, 1947 |

FOREIGN PATENTS

| | | |
|---|---|---|
| 538,587 | Great Britain | Aug. 8, 1941 |